United States Patent
Jong

(10) Patent No.: US 9,186,836 B1
(45) Date of Patent: Nov. 17, 2015

(54) PRODUCTION OF SYNTHETIC, NON-FLAMMABLE WICKER

(76) Inventor: Oe Miauw Jong, Woodland Hills, CA (US)

(*) Notice: Subject to any disclaimer, the term of this patent is extended or adjusted under 35 U.S.C. 154(b) by 1483 days.

(21) Appl. No.: 12/009,552

(22) Filed: Jan. 22, 2008

(51) Int. Cl.
B29B 7/42 (2006.01)
B29B 9/06 (2006.01)
B29C 47/60 (2006.01)
D01D 5/088 (2006.01)
D01D 1/02 (2006.01)
D01D 1/04 (2006.01)
D01D 1/10 (2006.01)
B29C 47/00 (2006.01)
B29C 47/88 (2006.01)

(52) U.S. Cl.
CPC ........... *B29C 47/003* (2013.01); *B29C 47/8895* (2013.01)

(58) Field of Classification Search
USPC ....... 264/178 F, 211, 211.12, 211.14, 211.22, 264/211.23
See application file for complete search history.

(56) References Cited

U.S. PATENT DOCUMENTS

| 4,055,941 | A | * | 11/1977 | Rivers et al. | 57/248 |
| 4,643,119 | A | * | 2/1987 | Langston et al. | 264/177.1 X |
| 5,651,928 | A | * | 7/1997 | Hodan et al. | 264/172.11 |
| 2002/0125595 | A1 | * | 9/2002 | Tunc | 264/40.1 |
| 2003/0042650 | A1 | * | 3/2003 | Vassilatos | 264/211.12 X |
| 2004/0186214 | A1 | * | 9/2004 | Li et al. | 524/474 |
| 2005/0046065 | A1 | * | 3/2005 | Cowan et al. | 264/211 X |
| 2005/0164586 | A1 | * | 7/2005 | Autran et al. | 442/361 |
| 2009/0326082 | A1 | * | 12/2009 | Cernohous | 521/40 |

FOREIGN PATENT DOCUMENTS

EP 0416780 A2 * 3/1991

* cited by examiner

*Primary Examiner* — Leo B Tentoni
(74) *Attorney, Agent, or Firm* — William W. Haefliger

(57) ABSTRACT

The method of producing a non-flammable synthetic wicker, that includes providing pellets incorporating polyethylene and flame retardant material; providing a screw conveyor means, introducing the pellets into the conveyor means and operating the conveyor means while heating the pellets, thereby forming a fluidized mixture and dispersing the flame retardant material throughout the mixture; extruding the fluidized and heated mixture in coherent strand form; cooling the extruded strand to partly solidify the strand; and winding the cooled strand, for use.

6 Claims, 8 Drawing Sheets

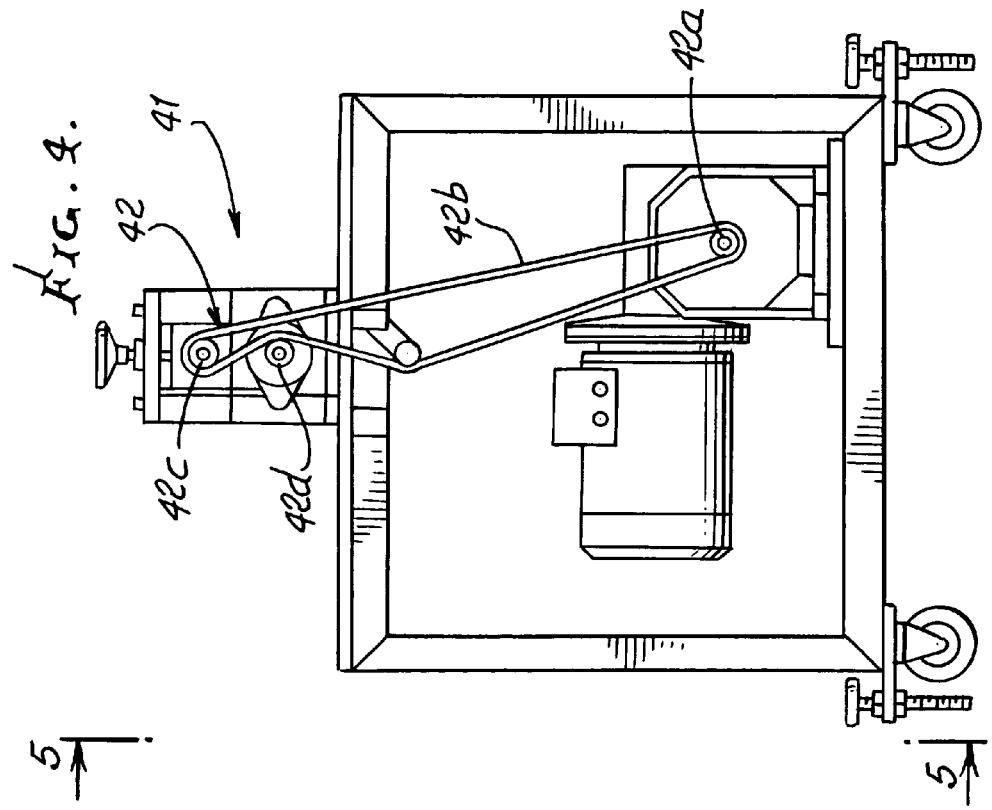
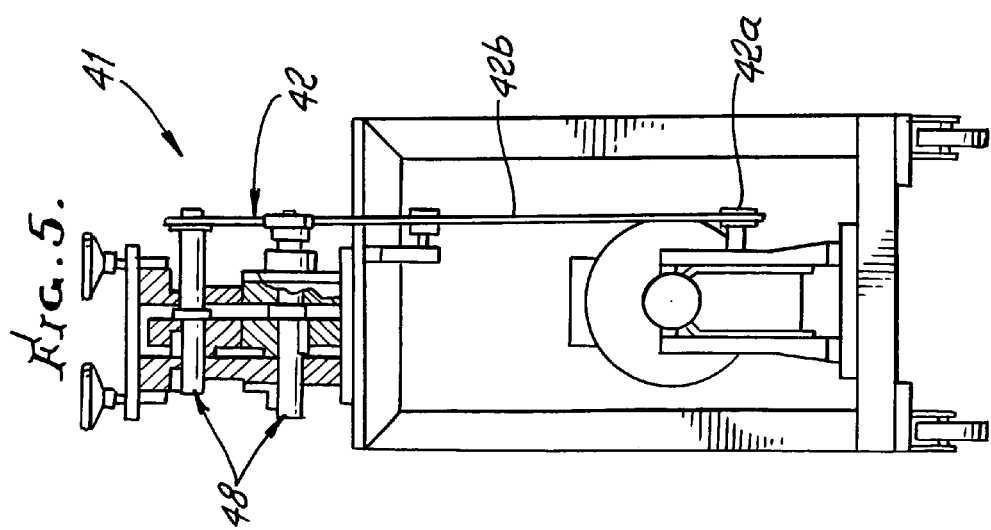

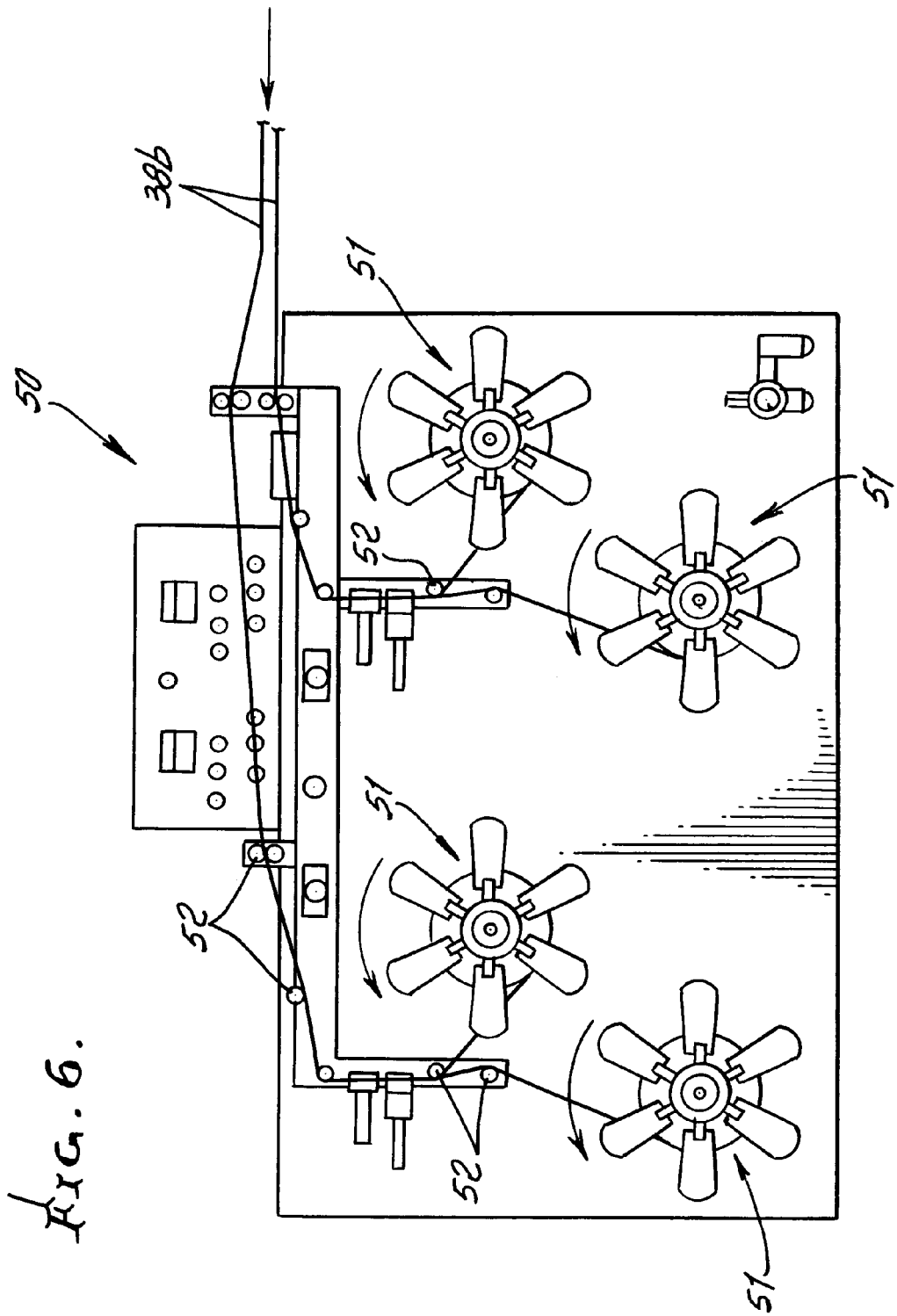

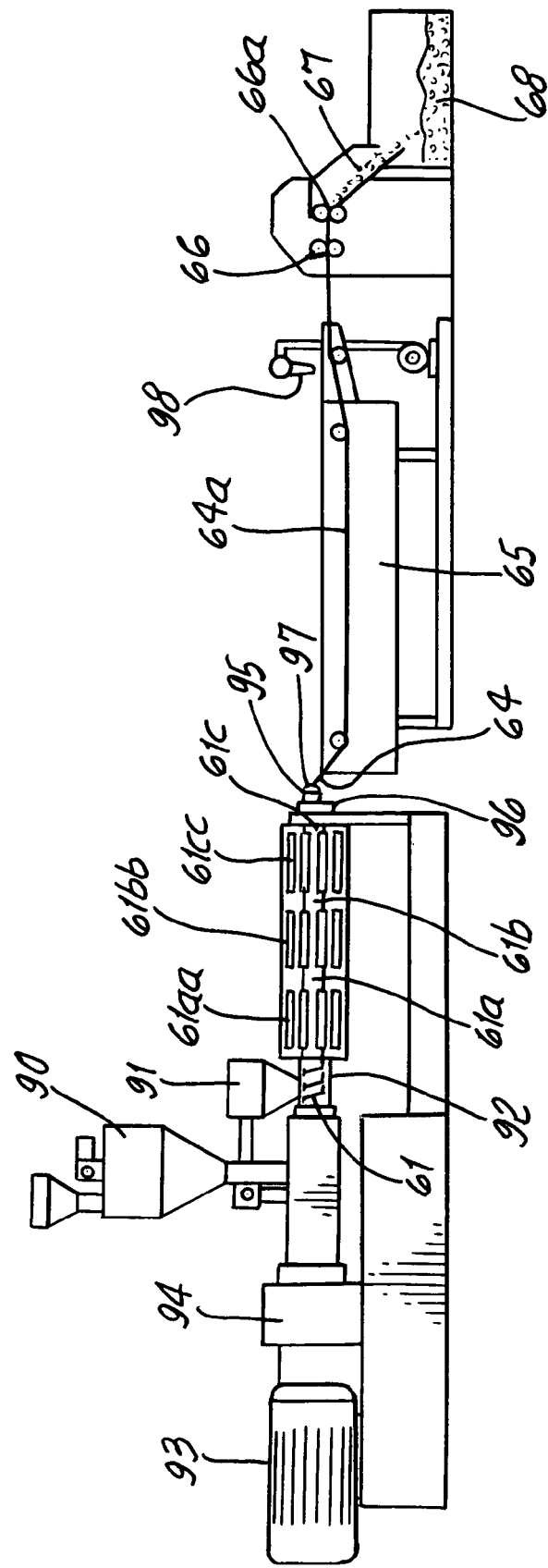

PRODUCTION OF SYNTHETIC, NON-FLAMMABLE WICKER

BACKGROUND OF THE INVENTION

This invention relates generally to production of synthetic wicker, and more particularly to non-flammable synthetic wicker.

In the past, wicker material, as for example is woven in sheets as for use in furniture, wall coverings, etc., was objectionable in that it could burn and become dangerous. Synthetic resinous wicker material was also subject to this objection. A need has arisen for a way or method to produce synthetic non-flammable wicker material, as for example attractively colored, safe, wicker strands.

SUMMARY OF THE INVENTION

It is a major object of the invention to provide method and means to meet the above referenced need. Basically, and in accordance with the invention the improved method now provided, for producing non-flammable synthetic wicker, includes the steps a) providing pellets incorporating polyethylene and flame retardant material, b) providing a screw conveyor means, introducing the pellets into the conveyor means and operating the conveyor means while heating the pellets, thereby forming a fluidized mixture and dispersing the flame retardant material throughout the mixture, c) extruding the fluidized and heated mixture in coherent strand form, d) cooling the extruded strand to partly solidify the strand, e) and storing, such as winding the cooled strand, for use.

As will be seen, the referenced conveyor means may comprise twin conveyor screws meshing in response to screw rotation to progressively form and mix the fluidized mixture, for extrusion, with said flame retardant material thoroughly dispersed therein.

Another object includes use of a particularly advantageous retardant consisting of EB 4374, a product of Ciba Chemical Company, Switzerland, readily incorporated into the composition in small amounts for flame retardation of the ultimately formed wicker strands.

Yet another object includes initially providing the mixture introduced to auxiliary conveyor means in powder form, to form said pellets typically containing polyethylene, flame retardant and pigment; and additional pigment may then be added to the pellet feed to the auxiliary conveyor means to control the ultimate color of the produced wicker strand.

A further object includes the step or steps of extruding the fluidized and heated mixture in the form of multiple strands extending in side by side adherent relation, and having selected colorations. For this purpose, multiple extrusion dies may be provided, and to which the fluidized mixture or multiple mixtures may be respectively provided, for extruding selected coloration adjacent strands, as will be seen.

These and other objects and advantages of the invention, as well as the details of an illustrative embodiment, will be more fully understood from the following specification and drawings, in which:

DRAWING DESCRIPTION

FIG. 4 is a side elevation showing a cooled wicker strand tensioner;

FIG. 5 is an end view taken on lines 5-5 of FIG. 4;

FIG. 6 is a tensioned wicker strand winder, i.e. bobbin type wind up device;

FIGS. 7a and 7b are modifications;

DETAILED DESCRIPTION

Figure 1:
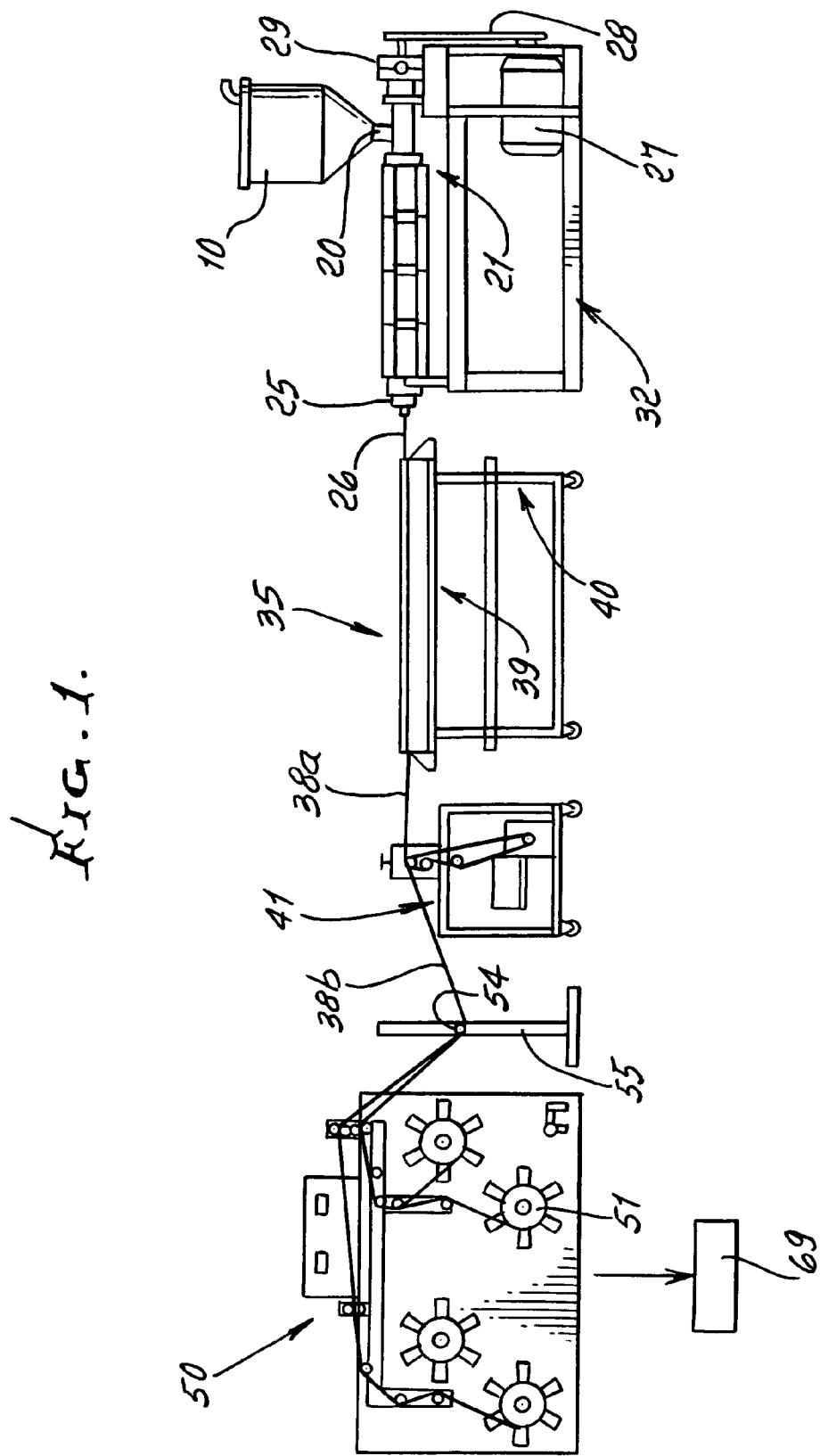
FIG. 1 is a process equipment diagram, providing a flow chart.
Figure 2:
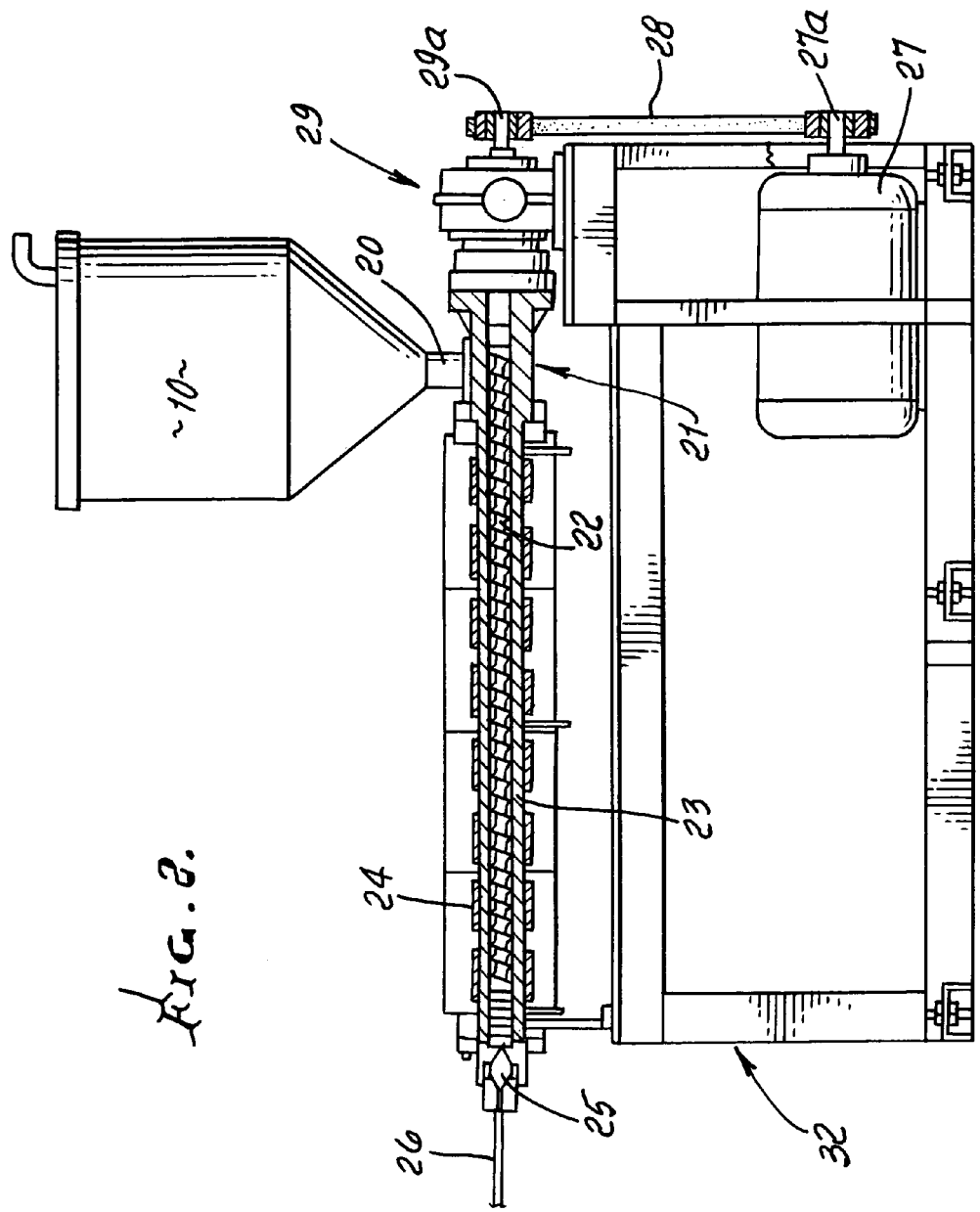
FIG. 2 is a side elevation showing a wicker strand extruder.

In FIGS. 1 and 2, pellets produced from a powdered feed mixture are provided as in a hopper 10. That mixture from which pellets are formed includes powdered synthetic resin, such as polyethylene, and powder form flame retardant material. Additional powder form materials in the mix include foaming agent; anti-oxidant; and pigment. Representative amounts of such materials for best results are as follows:

about 95 weight percent polyethylene about 2 to 4 weight percent EB 4374, a product of Ciba Chemical Company, Switzerland about 0.1 to 0.2 weight percent foaming agent about 1 to 2 weight percent pigment about 1 to 2 weight percent anti-oxidant.

The flame retardant is compatible with the mix, and especially the resin, to impart non-flammable property to the ultimate wicker product. Examples of foaming agents include Hydrocerol, a product of Clariant Corporation, Muttenz, Switzerland; examples of pigment include iron oxide, cadmium, aluminum flakes and organic pigments produced by Clariant Corporation; and examples of anti-oxidant include products, such as Irganox B215, of Ciba Chemical Co., Switzerland.

The pellets are delivered downwardly at 20 to an extrusion apparatus 21. The latter includes twin horizontal screws 22 driven in rotation and in meshing relation about horizontal axes, and within a barrel 23, which may also extend horizontally. The pellets material is progressively combined and fed leftwardly by the screws, and simultaneously and progressively heated as by heating band 24 extending about the barrel along its length. The heated material is fed to a die 25, from which it is extruded as a flexible, or fluidized (viscously flowable) coherent strand 26, at elevated temperature T. The latter is typically between 180 degrees and 200 degrees, Celcius.

The screws 22 are for example driven in rotation by a motor drive 27 having an output shaft 27a coupled by belt 28 to input shaft 29a of a gear box 29, operating to reduce the drive RPM to a level of about 60-70 RPM for rotating the screws. A stand 32 supports the above described equipment, as shown.

Figure 3:
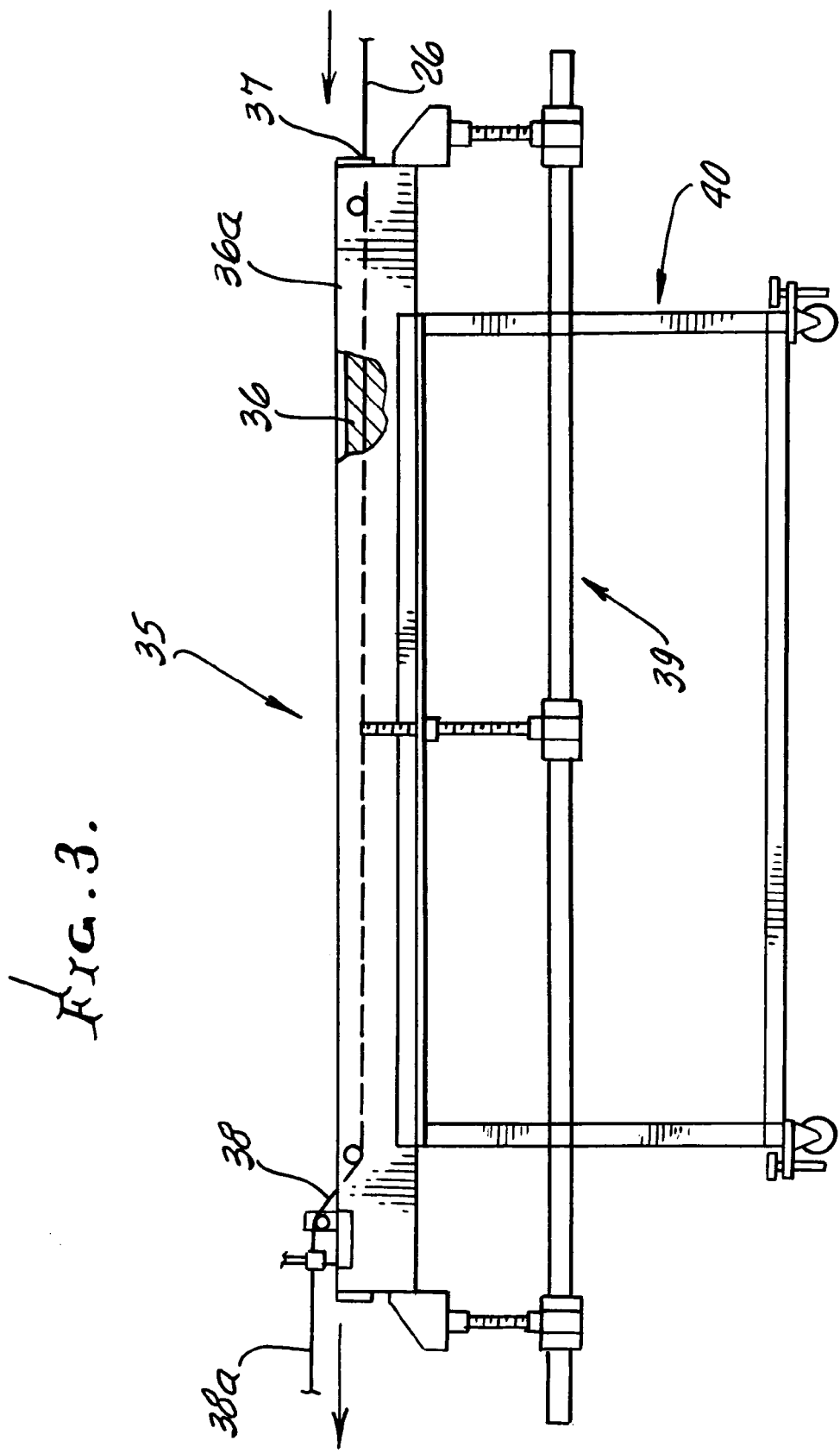
FIG. 3 is a side elevation showing an extruded strand cooling bath device.

The next step, provided by cooler apparatus 35 (see FIGS. 1 and 3) is to cool the leftwardly delivered and moving strand 26, to partly solidify the strand. A cooling bath 36 is provided as is a horizontal tray 36a. The strand moves leftwardly within the bath, entering it at 37 and emerging leftwardly at 38. Strand temperature is thereby reduced as from about 190 to 40-60° Celcius. Apparatus cooling equipment may be provided as at 39. Stand 40 supports the tray 36a and bath 36, which may consist of water at about 35 degrees Celcius.

The emergent strand at 38a is subjected to tension, acting to haul or pull it leftwardly through or from the bath. For this purpose, the strand may be passed through appropriate means such as rolls at 48 of a hauling device 41 having motor driven elements 42a acting to rotate the rolls operating to haul the strand leftwardly, progressively immersed in the bath and then emergent. Elements 42 may be adjusted to effect hauling of the strand at selected speed, as for example between 30 and 40 inches per second, coinciding with speed of extrusion.

From the device 41, the strand or strands at 38b is or are delivered to storage means 50, that may include a winding bobbin or bobbins 51. Strand directional pulleys are indicated at 52, in FIG. 6. The strand or strands pass or passes beneath a tension bar 54 acting to tension the strand or strands wound on the bobbin or bobbins. Stand 55 supports bar 54.

Figure 7:
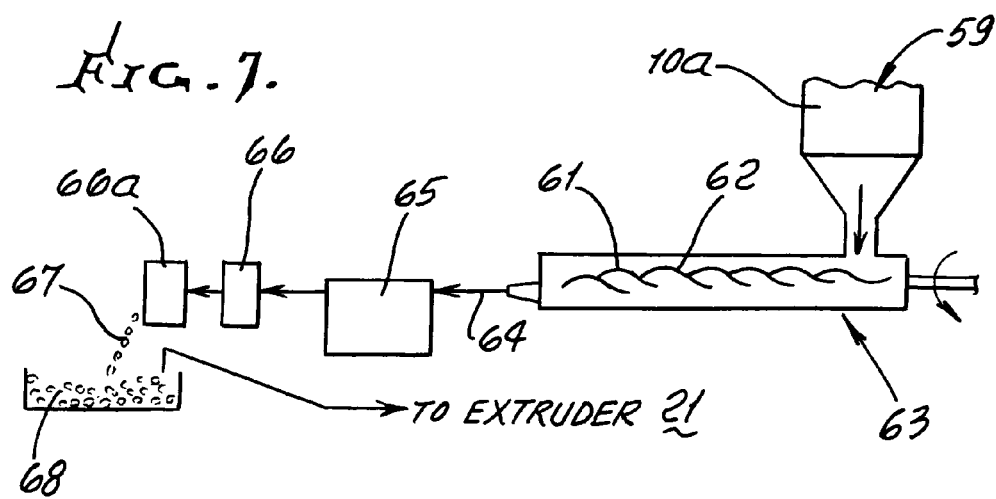
FIG. 7 is a view showing an initial process for producing pellets.

FIG. 7 shows an initial process to form "master batch" strand pellets at 67 and supplied to extruder 21. A mixing and pellet forming means 61 and an extruder barrel 63 serve to receive, advance, and thoroughly mix the feed from a hopper 10a, the powdered feed components being those referred to above. Discharge of the mix powder into the extruder is indicated at 20. Use of a single screw conveyor provides assurance that the powdered mix components, and particularly the flame retardant EB4374, are thoroughly dispersed and uniformly distributed in the mix as it is heated and formed into the preliminary strand 64. After cooling at 65, as described above, and hauling at 66, the strand is cut at 66a into pellets 67, collected at 68. Those pellets are then fed into hopper 10, to be fed to extruder 21 for processing as described above in FIG. 1. Accordingly, the flame retardant is processed twice, in extruders 21 and 23.

FIG. 7a is a more complete view of apparatus shown in FIG. 7. The powdered mix in hopper 90 is delivered to feeder 91, from which the mix is fed to horizontal, rotating barrel 92. Drive to rotate a screw convey 61 in that barrel includes a motor 93 and a gear box 94, the screw rotating at an RPM between 40 and 65. Successive barrel zones are indicated at 61a, 61b and 61c, with barrel heaters 61aa, 61bb and 61cc, the temperature in zone 61b exceeding the temperature in zone 61a, and the temperature in zone 61c exceeding that in zone 61b. For example, see the following:

zone 61a, about 170° C. to 180° C.
zone 61b, about 180° C. to 185° C.
zone 61c, about 190° C.

An extruder head 95 receives the heated, conveyed mix, and is typically heated to about 200° C.; a flange adapter 96 preceding that head is typically heated to about 210° C.; and the extrusion die or dies 97 are heated to about 180° C. to 200° C.

The heated, extruded strand 64 passes at 64a through water bath 65 for cooling, and is then air dried by dryer 98. The strand is hauled at 66 and cut at 66a into pellets 67, collected at 68.

Figure 7B:
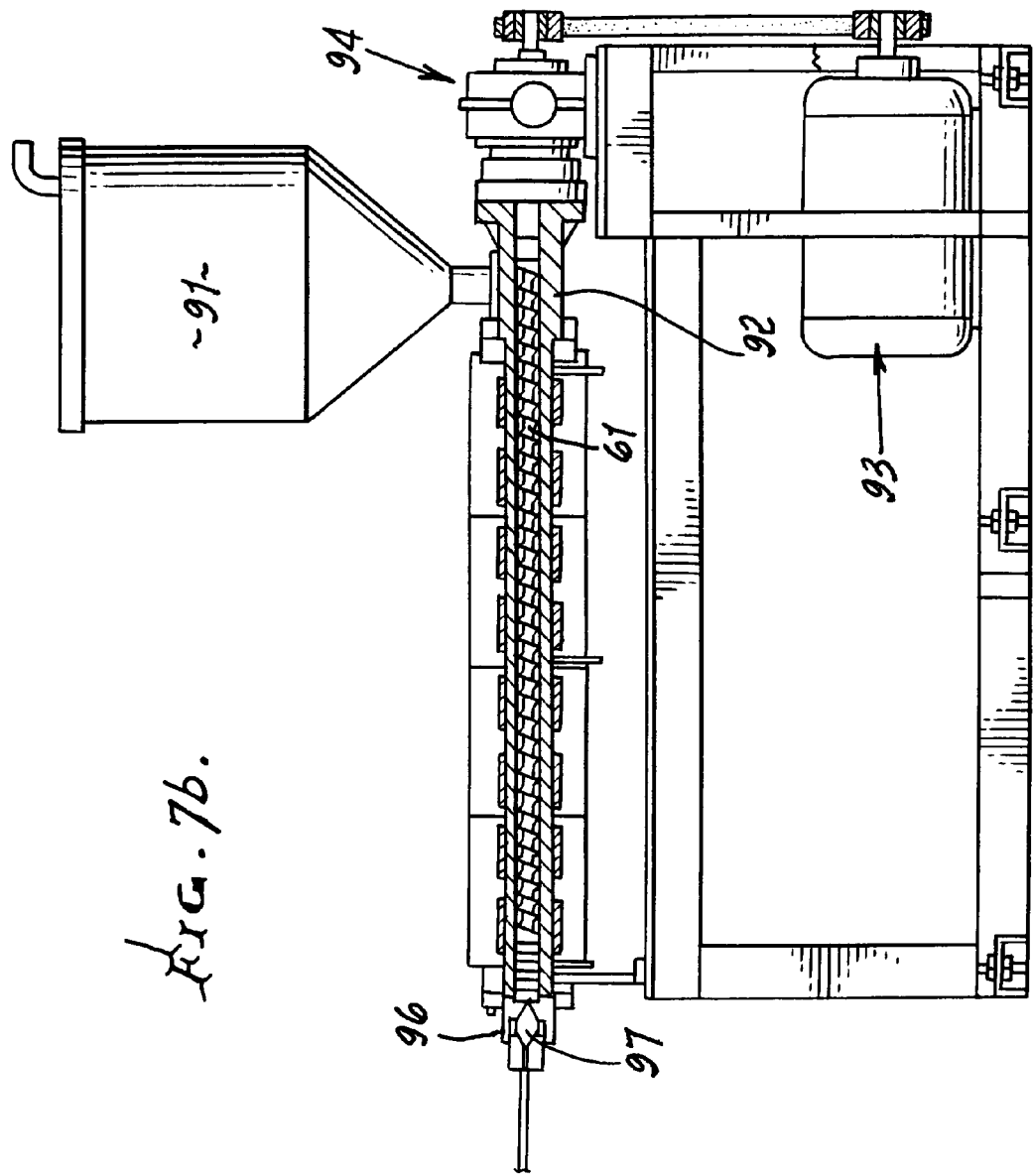

FIG. 7b shows a similar extrusion apparatus, with components having the same identifying numerals as are described in FIG. 7a.

Figure 8:
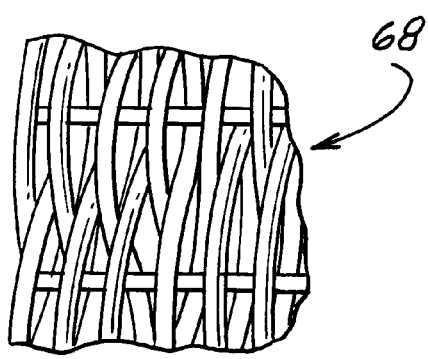
FIG. 8 is a view showing a mesh of wicker as produced by the present invention.

It is found that a substantially uniform wicker product is thereby formed, in terms of wicker composition, durability, strength and appearance, as in a woven wicker product. A representative such product is shown at 68, in FIG. 8. The wicker weaving step is indicated at 69 in FIG. 1.

Figure 9:
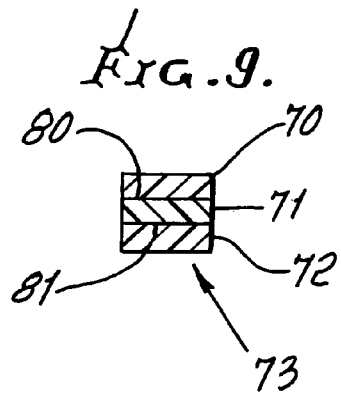
FIG. 9 shows a wicker strand product comprising multiple strands adhered together.
Figure 10:
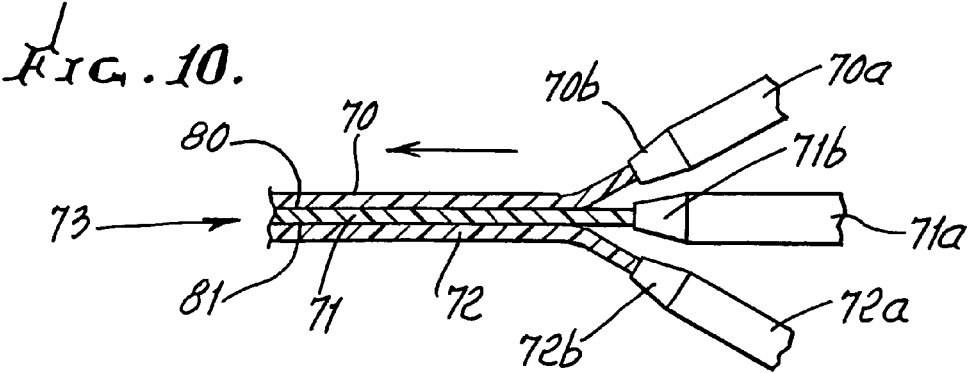
FIG. 10 shows multiple extrusions to produce the FIG. 9 strand.

Referring to FIG. 9, it shows multiple product strands 70-72 in cross section, each individually extruded and in side by side state as at interfaces 80 and 81, to adhere to one another, prior to being cooled as a single strand 73. FIG. 10 shows multiple extruders 70a-72a extruding the strands 70-72 from dies 70b-72b. Differently colored strands 70-72 may thereby be integrated into a multi-colored single product strand. The dies may be integrated as a single die having three discharge outlets or openings. The strand compositions differ, in that different pigments are added to the mixes forming the strands. Examples of such pigments are those referred to above.

Three said strands are simultaneously extruded in local linear side-by-side adherent relation with longitudinally linearly elongated wicker appearance, lateral spacing being maintained the same between outer two said strands at opposite sides of a medial strand, along the longitudinal length of the three strands, each of said three strands provided to be substantially rectangular in cross section with flat sides so that substantially the entireties of opposite flat sides of a medial strand cohere flatly to sides of the remaining two strands in conjunction with said extruding.

I claim:

1. The method of producing a non-flammable synthetic wicker, that includes:
    a) providing pellets incorporating polyethylene and flame retardant material,
    b) providing a screw conveyor means, introducing said pellets into the conveyor means and operating the conveyor means while heating the pellets, thereby forming a fluidized mixture and dispersing the flame retardant material throughout the mixture,
    c) extruding the fluidized and heated mixture in coherent strand form,
    d) cooling the extruded strand to partly solidify the strand,
    e) the following materials being also incorporated in the pellets introduced into the conveyor means:
        i) foaming agent,
        ii) anti-oxidant,
        iii) pigment,
    f) the pellets consisting essentially of
        about 95 weight percent polyethylene
        about 2 to 4 weight percent flame retardant
        about 0.1 to 0.2 weight percent foaming agent
        about 1 to 2 weight percent pigment
        about 1 to 2 weight percent anti-oxidant,
    g) and including initially forming said pellets by extrusion of a mixture of powder form materials defined in f) above,
    h) and including providing a heated barrel having successive interior zones at successively higher temperature, and a screw conveyor rotating in said zones to convey said materials under pressure to an extrusion die at high temperature, and via which a coherent strand is extruded, and subsequently cooled in a coolant bath prior to pellet formation,
    i) and wherein said zones are maintained at temperatures within the range about 170° C. to about 190° C.,
    j) and wherein three said strands are simultaneously extruded in local linear side-by-side adherent relation with longitudinally linearly elongated wicker appearance, lateral spacing being maintained the same between outer two said strands at opposite sides of a medial strand, along the longitudinal length of the three strands, each of said three strands provided to be rectangular in cross section with flat sides and four right angles at corners so that substantially the entireties of opposite flat sides of a medial strand cohere flatly to sides of the remaining two strands in conjunction with said extruding.

2. The method of claim 1 wherein the conveyor means comprises twin conveyor screws meshing in response to screw rotation to progressively form said fluidized mixture for extrusion with said flame retardant material thoroughly dispersed therein.

3. The method of claim 1 wherein said cooling includes passing the extruded strand through a liquid bath, while exerting tension on the strand, and controlling said tension to control the cooled strand cross-section.

4. The method of claim 1 including the step of adding additional pigment to the mixture to control the ultimate color of the strand.

5. The method of claim 1 two of said three strands are extruded at opposite sides of an intermediate strand, the strands having selected colorations.

6. The method of claim 5 including providing multiple extrusion dies to which fluidized mixture or mixtures of selected coloration are delivered.

* * * * *